(12) United States Patent
Yanase et al.

(10) Patent No.: US 8,586,256 B2
(45) Date of Patent: Nov. 19, 2013

(54) POWER SUPPLY APPARATUS

(75) Inventors: Norimasa Yanase, Chiba (JP); Noboru Ishisone, Chiba (JP); Tsuneaki Tamachi, Chiba (JP); Toru Ozaki, Chiba (JP); Takafumi Sarata, Chiba (JP); Kazutaka Yuzurihara, Chiba (JP); Fumiharu Iwasaki, Chiba (JP)

(73) Assignee: Seiko Instruments Inc. (JP)

( * ) Notice: Subject to any disclaimer, the term of this patent is extended or adjusted under 35 U.S.C. 154(b) by 449 days.

(21) Appl. No.: 12/451,693

(22) PCT Filed: May 29, 2008

(86) PCT No.: PCT/JP2008/059878
§ 371 (c)(1),
(2), (4) Date: Nov. 24, 2009

(87) PCT Pub. No.: WO2009/008229
PCT Pub. Date: Jan. 15, 2009

(65) Prior Publication Data
US 2010/0261083 A1    Oct. 14, 2010

(30) Foreign Application Priority Data
Jul. 10, 2007    (JP) .................................. 2007-181268

(51) Int. Cl.
*H01M 8/04*    (2006.01)

(52) U.S. Cl.
USPC .......................................... 429/432; 429/430

(58) Field of Classification Search
USPC ............................ 420/430–432; 429/430–432
See application file for complete search history.

(56) References Cited

U.S. PATENT DOCUMENTS

| | | | | |
|---|---|---|---|---|
| 6,140,820 | A * | 10/2000 | James | 324/434 |
| 2004/0126635 | A1* | 7/2004 | Pearson | 429/23 |
| 2005/0037247 | A1* | 2/2005 | Takahashi | 429/23 |

FOREIGN PATENT DOCUMENTS

| | | |
|---|---|---|
| JP | 02226665 | 9/1990 |
| JP | 10341535 | 12/1998 |
| JP | 2000312445 | 11/2000 |
| JP | 2003163017 | 6/2003 |
| JP | 2004079537 | 3/2004 |
| JP | 2004120831 | 4/2004 |
| JP | 20043036241 | 10/2004 |
| JP | 2004311112 | 11/2004 |
| JP | 2004364387 | 12/2004 |
| JP | 2005085509 | 3/2005 |
| JP | 2006073379 | 3/2006 |
| JP | 2006114481 | 4/2006 |
| JP | 2007042501 | 2/2007 |

* cited by examiner

OTHER PUBLICATIONS

Definition for "configure", Aug. 29, 2012, http://dictionary.reference.com/browse/configure.*

*Primary Examiner* — Eugenia Wang
(74) *Attorney, Agent, or Firm* — Adams & Wilks

(57) ABSTRACT

A power supply apparatus has a combined power source with power cells configured electrically independently. A switch arbitrarily changes connection paths of the power cells by selectively connecting power cell terminals through switching elements. A voltage detector detects differences in electrical potentials between the power cell terminals. A controller controls ON-OFF states of the switching elements by controlling the switch by a control signal generated based on voltage signals representing the differences in electrical potentials detected by the voltage detector so as to isolate one of the power cells to stop a supply of electric power therefrom when a voltage generated in the power cell has dropped to a specified voltage or lower. The controller restarts the supply of electric power from the power cell whose power supply has been stopped when the duration of a down time of the power cell has reached a predetermined time or longer.

17 Claims, 7 Drawing Sheets

POWER SUPPLY APPARATUS

CROSS-REFERENCE TO RELATED APPLICATIONS

This application is a U.S. national stage application of International Application No. PCT/JP2008/059878 filed May 29, 2008, claiming a priority date of Jul. 10, 2007, and published in a non-English language.

BACKGROUND OF THE INVENTION

1. Technical Field

This invention relates to a power supply apparatus and, more specifically, to a power supply apparatus for preventing a pole change or reversal of a plurality of power cells configured electrically independently, while continuing their reasonable operation, and for performing a reasonable operation conforming to a load power.

2. Background Art

FIG. 7 is a block diagram showing a fuel cell apparatus according to a conventional technology (Patent Document 1). As shown in this drawing, the fuel cell apparatus is designed to supply electric power, which has been generated in a fuel cell stack 100, to a load 109 via a power converter 103 for regulating the electric power to be a predetermined output voltage (desired voltage) designated by a controller 108.

The fuel cell stack 100 has a plurality of unit cells 110 connected in series, and each of the unit cells 110 is supplied with a fuel and air via a fuel supply device 101 and an air supply device 102. The controller 108 sets the amount of fuel supply and the amount of air supply for each unit cell 110 based on the respective voltages of the plurality of unit cells 110 measured by a voltage measuring instrument 105, allows the fuel to be supplied to each unit cell 110 via the fuel supply device 101 based on the amount of fuel supply for each unit cell 110, and allows air to be supplied to each unit cell 110 via the air supply device 102 based on the amount of air supply for each unit cell 110. The purpose of this procedure is to minimize variations in the respective voltages of the plurality of unit cells 110.

In this manner, the amount of fuel supply is increased or decreased for each unit cell 110 to stabilize the electric power generated, thereby preventing declines in the voltages of the unit cells 110 and the deterioration of each unit cell 110, due to variations in the characteristics of each unit cell 110 or variations in the supply of fuel. That is, variations in the voltages of the unit cells 110 are curtailed in an attempt to stabilize the electric power generated by the fuel cell stack 100.

Patent Document 1: JP-A-2006-73379
Patent Document 2: JP-A-2004-303621

The above-described fuel cell apparatus according to the conventional technology is designed to curtail variations in the voltages of the unit cells 110, thereby stabilizing the electric power generated by the fuel cell stack 100. However, the fuel cell apparatus cannot detect an abnormal drop in a voltage generated by each unit cell 110. If the unit cell 110 with such an abnormally dropped voltage continues to be used, the unit cell 110 undergoes reversal and becomes unusable.

To prevent reversal, a technology, which comprises detecting a voltage generated in each power generation cell and isolating an abnormal power generation cell from the stack, has been proposed (Patent Document 2). With this technology, however, there is the problem that once a power generation cell has generated an abnormal voltage, this power generation cell is continuously isolated, making a reasonable operation impossible. That is, with the technology disclosed in Patent Document 2, once the generated voltage has fallen, the isolated state is continued even when power generation capacity recovers later. However, even after an abnormal drop in the generated power for a cause, such as fuel insufficiency, temporary stoppage or halt of power supply often results in the subsequent recovery of power generation capacity. In such a case, it is not necessary to continue the isolated state of the power generation cell.

The fuel cell apparatus shown in FIG. 7 mentioned above, on the other hand, has the fuel supply device 101 for each unit cell 110. Thus, it also has problems, such that 1) the structure of the fuel cell apparatus is complicated, 2) the fuel cell apparatus is upsized, and 3) the weight of the fuel cell apparatus is increased.

Even upon control for increasing or decreasing fuel supply, there may be a case where a drop in the voltage of each unit cell 110 cannot be prevented (for example, the fuel supply path is clogged, or the cell is short-circuited (physically or chemically)). In this case, the effect of stabilizing the generated power due to control for increasing or decreasing fuel supply is not obtained, causing the problem of wasteful fuel supply and fuel consumption.

The present invention has been accomplished in the light of the above-described conventional technologies. It is an object of the invention to provide a fuel cell apparatus which can detect an abnormal voltage drop in a power generation cell and, if its power generation capacity is recovered, resume power generation; and can select a cell necessary for power generation in accordance with a load power, thereby realizing reasonable and stable power supply to the load with long-term power generation reliability.

SUMMARY OF THE INVENTION

A first aspect of the present invention for attaining the above object is a power supply apparatus, comprising:
  a combined power source composed of a plurality of power cells configured electrically independently;
  a switch, connected to the combined power source, for arbitrarily changing connection paths of the respective power cells by selectively connecting terminals of the plurality of power cells through switching elements, the switch having the same number of input terminals as the number of the terminals of the plurality of power cells and two-electrode output terminals;
  a voltage detector for respectively detecting differences in electrical potentials between the terminals of the plurality of power cells; and
  a controller for controlling the switch by a control signal to control ON-OFF states of the switching elements so as to halt a supply of power from the power cell when an output voltage of the power cell has dropped to a set voltage or lower, as found based on voltage signals which respectively indicate the differences in electrical potentials detected by the voltage detector, and resume the supply of power from the power cell whose power supply has been halted when a down time in the power cell during a halt in power supply has reached a predetermined time or longer.

A second aspect of the present invention is the power supply apparatus according to the first aspect, characterized in that
  the switch has the switching elements, whose number is equal to the number of the power cells, between the positive electrode of output ports of the switch and positive electrodes of the respective power cells; the switching elements, whose number is equal to the number of the power cells, between the negative electrode of the output ports of the switch and negative electrodes of the respective power cells; and the switching elements, whose number is smaller than the number of the power cells by one, between the power cells adjacent in a series direction of the power cells.

A third aspect of the present invention is the power supply apparatus according to the first or second aspect, further comprising:

a voltage regulator, connected between the switch and a load, for stabilizing a voltage supplied to the load; and an output detector for detecting a power consumption in the load and/or an output power of the combined power source, and characterized in that the controller controls the ON-OFF states of the switching elements by controlling the switch by the control signal generated based on the voltage signals representing the differences in electrical potentials detected by the voltage detector, the power consumption, and the output power of the combined power source.

A fourth aspect of the present invention is the power supply apparatus according to the third aspect, characterized in that the controller includes processing for controlling a connection status of each of the power cells via the switch so as to halt the supply of power from the power cell having the lowest output voltage, if it has been detected that a power value detected by the output detector is equal to or lower than an output power preset based on output characteristics of the combined power source.

A fifth aspect of the present invention is the power supply apparatus according to the third aspect, characterized in that the controller includes processing for controlling a connection status of each of the power cells via the switch so as to halt the supply of power from the power cell having the lowest output voltage, when a continuous power generation time of each of the power cells becomes a predetermined time or longer, if it has been detected that a power value detected by the output detector is equal to or lower than an output power preset based on output characteristics of the combined power source.

A sixth aspect of the present invention is the power supply apparatus according to the third aspect, characterized in that the controller includes processing for controlling a connection status of each of the power cells via the switch so as to halt the supply of power from the plurality of power cells in order of increasing output voltage, when a continuous power generation time of each of the power cells becomes a predetermined time or longer, if it has been detected that a power value detected by the output detector is equal to or lower than an output power preset based on output characteristics of the combined power source.

A seventh aspect of the present invention is the power supply apparatus according to the third aspect, characterized in that the controller includes processing for controlling a connection status of each of the power cells via the switch so as to halt the supply of power from the power cell having the lowest output voltage and resume the supply of power from the power cell whose power supply has been halted until then, when a continuous power generation time of each of the power cells becomes a predetermined time or longer, if it has been detected that a power value detected by the output detector is equal to or lower than an output power preset based on output characteristics of the combined power source.

An eighth aspect of the present invention is the power supply apparatus according to anyone of the third to seventh aspects, characterized in that the output detector detects the power consumption based on an output voltage of the voltage regulator and a load current supplied to the load.

A ninth aspect of the present invention is the power supply apparatus according to any one of the first to eighth aspects, characterized in that the voltage detector connects output ports of the respective power cells to a multiplexer, sequentially switches and scans the power cells, whose voltages are to be detected, by a control signal of the controller, and connects a voltage detecting instrument to an output port of the multiplexer to supply the voltage signals of the respective power cells sequentially to the controller.

According to the present invention, control is exercised such that when the output voltage between the electrodes of each power cell has dropped to a set voltage or lower, this power cell is isolated to halt the supply of power therefrom, and when recovery of outputting capacity of the isolated power cell has been detected, the supply of power from it is resumed. Thus, reversal of the power cell can be prevented and, when its outputting capacity is recovered, its outputting is resumed, whereby the reasonable operation of the power supply apparatus can be achieved, with the reversal of each power cell being prevented.

According to the present invention, moreover, the terminals of the plurality of power cells configured electrically independently can be selectively connected by the switching elements. Thus, it is easy to combine the power cells in accordance with the load. Consequently, 1) stabilization of power supply by the power supply apparatus, 2) enhancement of long-term reliability of the power cells, and 3) long life of the power supply apparatus can be realized at the same time. The provision of the cells at rest, in particular, renders a long-term continuous operation possible. From this aspect as well, reliability can be increased. That is, load distribution among the plurality of power cells, stable power supply, and long life of the power source can be achieved.

Figure 1:
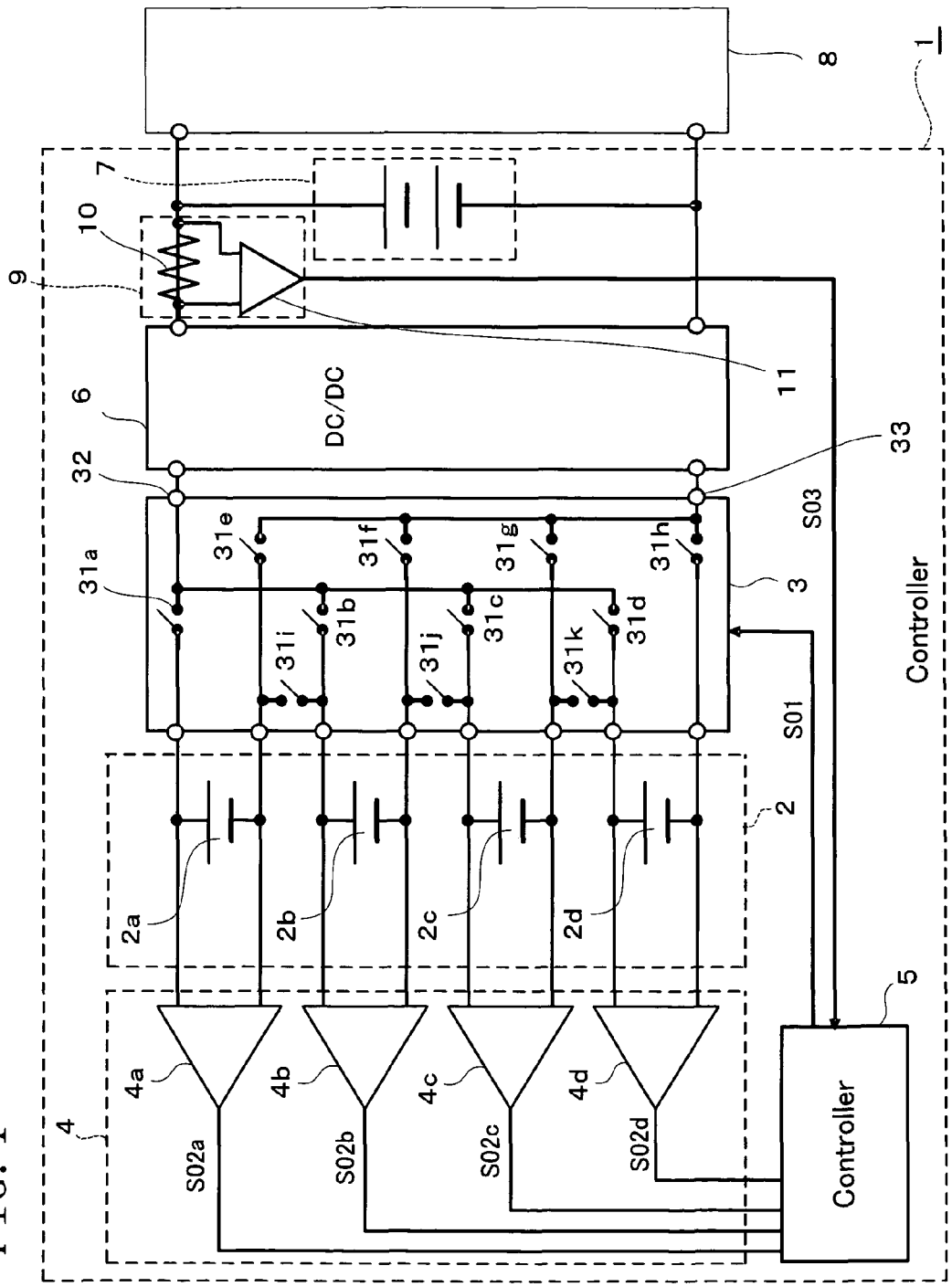
FIG. 1 is a block diagram showing a power supply apparatus according to a first embodiment of the present invention.
Figure 2:
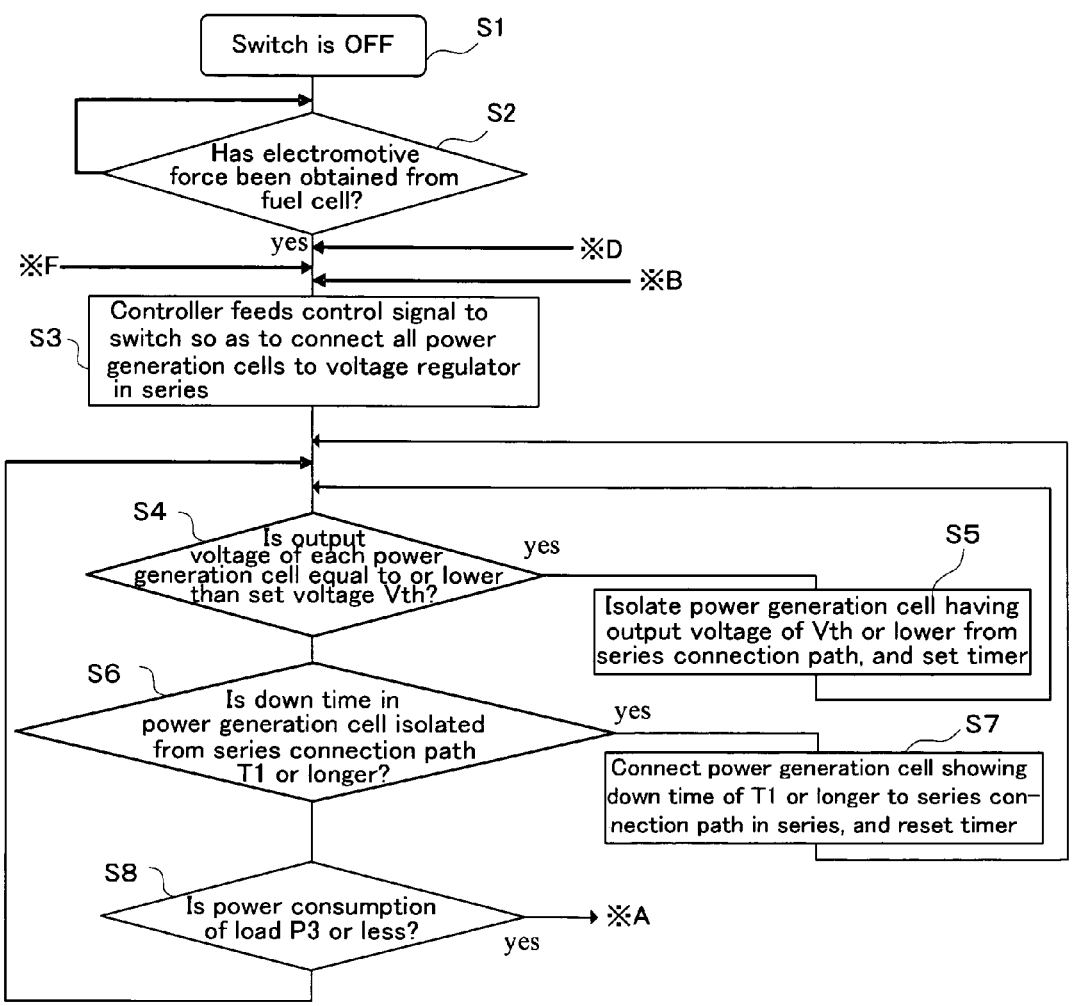
FIG. 2 is a flow chart showing a control procedure in a controller of the power supply apparatus shown in FIG. 1.
Figure 3:
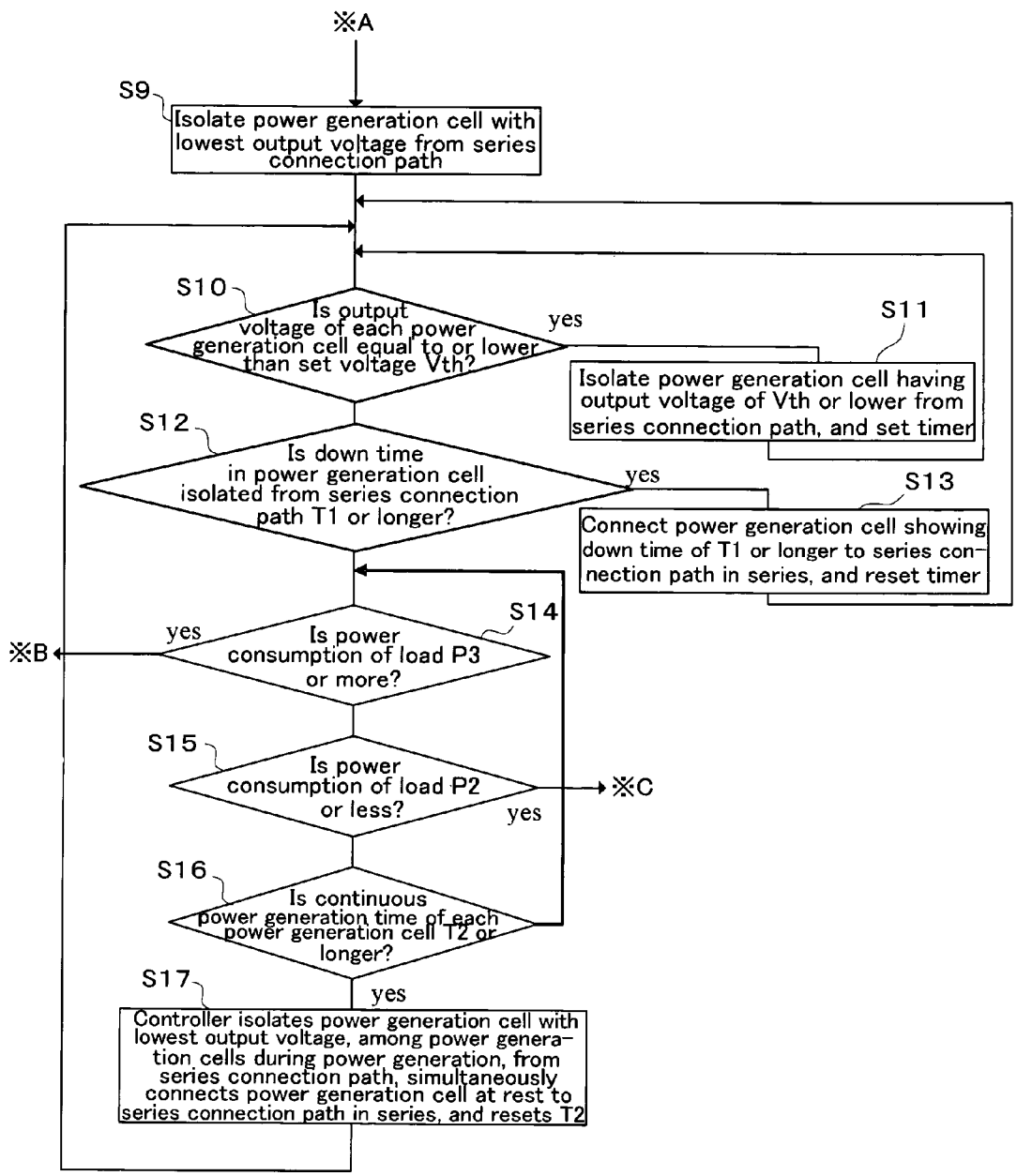
FIG. 3 is a flow chart showing the control procedure in the controller of the power supply apparatus shown in FIG. 1.
Figure 4:
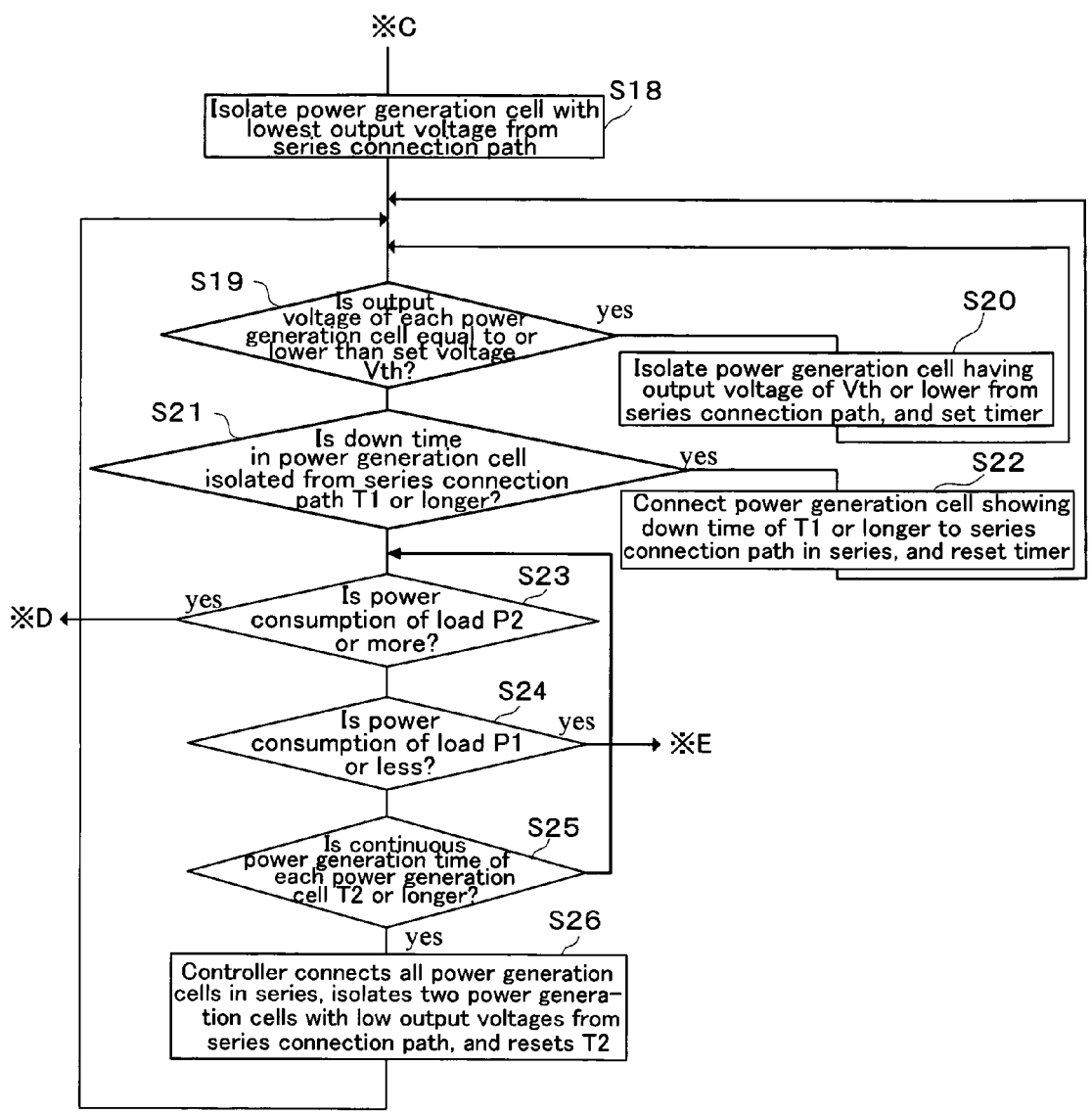
FIG. 4 is a flow chart showing the control procedure in the controller of the power supply apparatus shown in FIG. 1.
Figure 5:
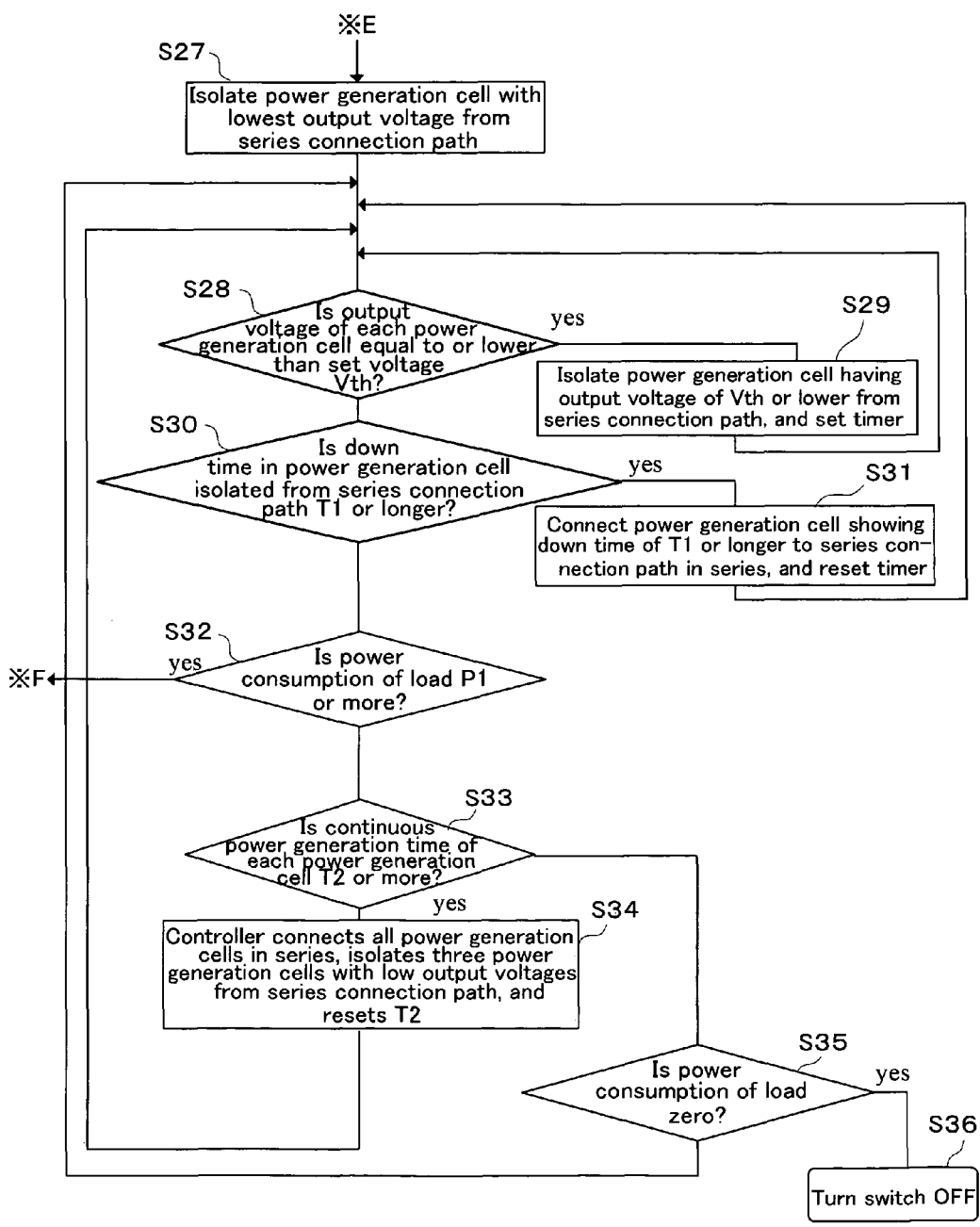
FIG. 5 is a flow chart showing the control procedure in the controller of the power supply apparatus shown in FIG. 1.

DESCRIPTION OF THE NUMERALS AND SYMBOLS 1, 21 Power supply apparatus
2 Fuel cell
2a to 2d Power generation cell 3 Switch
4, 41 Voltage detector
5, 51 Controller
6 Voltage regulator
8 Load
9 Current detector
31a to 31k Switching element
32, 33 Output port
42 Analog multiplexer
S01, S04 Control signal
S02a to S02d Voltage signal
S03 Load current signal

DETAILED DESCRIPTION OF THE INVENTION

Embodiments of the present invention will now be described in detail based on the accompanying drawings.

First Embodiment

FIG. 1 is a block diagram showing a power supply apparatus according to a first embodiment of the present invention. As shown in the drawing, a power supply apparatus 1 according to the present embodiment has a fuel cell 2 equipped with a plurality of power generation cells 2a, 2b, 2c, 2d as power cells; a switch 3 for switching, as appropriate, the terminals of the power generation cells 2a to 2d and connecting them; a voltage detector 4 for measuring voltages between the terminals of the power generation cells 2a to 2d; a controller 5 for exercising control for changing connection paths of the switch 3 based on output signals of the voltage detector 4 and a current detector 9; a voltage regulator 6 for stabilizing a voltage supplied to a load 8; a charge and discharge device 7 capable of electrical charging and discharging; and a current detector 9 composed of a current detecting amplifier 11 for detecting a load current.

In further detail, the power generation cells 2a to 2d are adapted to generate power upon supply of fuel from a fuel supply device (not shown), and the power generation cells 2a to 2d are configured electrically independently. Here, the term "configured electrically independently" refers to a state in which the power generation cells 2a to 2d are not directly connected to each other, but are necessarily connected via the switch 3.

The power generation cells 2a to 2d in the present embodiment are each composed of a polymer electrolyte fuel cell (PEFC) which generates power by supplying hydrogen, as a fuel, to an anode (negative electrode) and oxygen (air) to a cathode (positive electrode). The power generation cells 2a to 2d used here are four power generation cells each of which obtains a maximum output of 1.08 [W] when its output voltage is 0.45 [V]. The standard operating voltage of each of the power generation cells 2a to 2d is 0.6 V, and this voltage is the lower-limit operating voltage for each of the power generation cells 2a to 2d. The standard voltage is set within a voltage range where a marked diffusion overvoltage is not observed in the power generation characteristics of the power generation cells 2a to 2d and, in the case of PEFC, it is set to be between about 0.3 and 0.8 V.

The standard output power of each of the power generation cells 2a to 2d in the present embodiment is 0.72 [W] (hereinafter, this output power will be referred to simply as "P1"). Thus, when these four power generation cells 2a to 2d produce power, an output of 0.72 [W]×4=2.88 [W] (hereinafter, this output power will be referred to simply as "P4") is obtained. When three of the power generation cells 2a to 2d produce power, an output of 0.72 [w]×3=2.16 [W] (hereinafter, this output power will be referred to simply as "P3") is obtained. When two of the power generation cells 2a to 2d produce power, an output of 0.72 [W]×2=1.44 [W] (hereinafter, this output power will be referred to simply as "P2") is obtained. In the present embodiment, therefore, P1, P2, P3 and P4, which are the output powers obtained by multiplying the above standard output power by the numbers of the power generation cells 2a to 2d, are respectively "the output powers preset based on the power generation characteristics of the fuel cell 2".

The power generation cells 2a to 2d may each be a direct methanol fuel cell (DMFC) using methanol as a fuel supplied to the anode, a solid oxide fuel cell (SOFC), a molten carbonate fuel cell (MCFC), or a fuel cell of other type. Moreover, the number of the power generation cells 2a to 2d is not limited to four, but can be a number set as required.

Instead of the power generation cells, there can be used a plurality of power cells of different types or the same type, for example, primary cells such as manganese dry cells, alkaline manganese oxide dry cells, nickel type dry cells, alkaline button cells, silver oxide cells, lithium manganese dioxide cells, lithium thionyl chloride cells, and air zinc cells; secondary cells capable of repeated charging and discharging, typified by lead storage batteries, nickel-hydrogen secondary cells, lithium ion secondary cells, and sodium-sulfur cells; condensers which accumulate electric charge and electrostatic energy upon application of voltage to obtain electric capacity, such as condensers, capacitors, and electric double layer condensers; solar cells; and thermoelectromotive force batteries. These power cells may be connected arbitrarily, for example, in series or in parallel, to constitute the fuel cell 2.

The switch 3 is composed of a plurality of (eleven in the present embodiment) switching elements 31a to 31k. The switching elements 31a to 31k include first, second and third switching elements connected, respectively, between an output port 32 on the positive side of the switch 3 and the positive electrodes of the power generation cells 2a to 2d, between an output port 33 on the negative side of the switch 3 and the negative electrodes of the power generation cells 2a to 2d, and between the power generation cells (2a and 2b), (2b and 2c), and (2c and 2d) adjacent in the series direction. That is, the first switching elements 31a to 31d, whose number is equal to the number of the power generation cells 2a to 2d, are connected between the output port 32 on the positive side and the positive electrodes of the power generation cells 2a to 2d. The second switching elements 31e to 31h, whose number is equal to the number of the power generation cells 2a to 2d, are connected between the output port 33 on the negative side and the negative electrodes of the power generation cells 2a to 2d. The third switching elements 31i to 31k, whose number is smaller than the number of the power generation cells 2a to 2d by one, are connected between the power generation cells (2a and 2b) to (2c and 2d) adjacent in the series direction.

As a result, the power generation cells 2a to 2d can be connected arbitrarily depending on the ON-OFF states of the switching elements 31a to 31k of the switch 3. That is, the power generation cells 2a to 2d can be connected to each other in series, or connected to each other in parallel. Alternatively, the power generation cells 2a to 2d connected in series can be connected in parallel.

The switching elements 31a to 31k in the present embodiment are composed of MOS-FETs which are field effect transistors. The switching elements 31a to 31k can be composed of relay elements, transistor elements, TTL elements, C-MOS elements, and ECL elements as well as MOS-FETs. That is, any elements having a switching function can be used without limitation.

The ON-OFF states of the switching elements 31a to 31k are controlled by a control signal S01 which is the output signal of the controller 5.

The voltage detector 4 has voltage detecting amplifiers 4a, 4b, 4c, 4d connected between both electrodes of the power generation cells 2a to 2d. The voltage detector 4 converts differential input voltages from the power generation cells 2a to 2d into voltage signals S02a, S02b, S02c, S02d, which are single-ended signals with reference to the potential at the negative terminal of the charge and discharge device 7, and supplies these voltage signals to the controller 5.

The controller 5 is composed of a microcomputer. The microcomputer has programs written thereinto for taking in the voltage signals S02a to S02d from the voltage detector 4 and a load current signal S03 from the current detector 9 to control the selection of the ON-OFF states of the switching elements 31a to 31k in the switch 3 based on an internal clock. As a result, the controller 5 in the present embodiment exercises 1) first control for preventing reversal, and resuming the supply of power from any of the power generation cells 2a to 2d recovering the power generation capacity, and 2) second control for changing the connection status of the power generation cells 2a to 2d in conformity with the load power, and selecting, as appropriate, the power generation cells 2a to 2d whose power supply is to be halted, thereby contributing to a reasonable operation.

The voltage regulator 6 adjusts an output voltage delivered by the fuel cell 2 via the switch 3 to a predetermined voltage, and can be preferably composed of a DC-DC converter. Generally, the voltage regulator 6 may be a device which regulates a direct-current voltage inputted into the voltage regulator 6, and outputs a stabilized direct-current voltage. Depending on the load 8, the voltage regulator 6 may be a device for outputting an alternating-current voltage. A DC-AC converter (inverter) is known as a voltage regulator for outputting a stabilized alternating-current voltage.

The DC-DC converter may be one which can convert the direct-current voltage of the fuel cell 2 into a direct-current voltage not impeding the action of the load 8, and can supply power to the load 8. More preferably, the voltage supplied to the load 8 is stabilized and constant. The type of the DC-DC converter is, for example, a series regulator, a switching regulator, a charge pump, or a switched capacitor. Similarly, the DC-AC converter may be one which can convert the direct-current voltage of the fuel cell 2 into an alternating-current voltage not impeding the action of the load 8, and can supply power to the load 8.

In the present embodiment, a step-up and step-down synchronous rectifying switching regulator is used as the voltage regulator 6, and its output voltage is set at 7.4 V.

The charge and discharge device 7 can be preferably composed of a secondary battery capable of repeated charging and discharging, typified by a lead storage battery, a nickel-hydrogen secondary battery, or a lithium ion secondary battery; or a condenser which accumulates electric charge and electrostatic energy upon application of a voltage to obtain electric capacity, such as a condenser, a capacitor, or an electric double layer condenser. Preferred as the secondary battery is a battery which does not exhibit a memory effect as done by a nickel-cadmium secondary battery. It is also possible to select the type of a suitable secondary battery or condenser according to the operating voltage, the minimum operating voltage, the load characteristics, etc. of the load 8 and, if necessary, connect the secondary batteries or the condensers in series, thereby adjusting the voltage supplied to the load 8. The charge and discharge device 7 in the present embodiment is composed of two lithium ion secondary batteries connected in series. The capacity of the charge and discharge device 7 is 400 mAh.

The current detector 9 in the present embodiment has a shunt resistor 10, through which a load current supplied to the load 8 flows via the voltage regulator 6, and the current detecting amplifier 11 for detecting the load current via the voltage between both ends of the shunt resistor 10, in order to detect the output power of the fuel cell 2. That is, the load current signal S03 representing the load current is entered into the controller 5, whereby a predetermined computation is performed in the controller 5 based on the output voltage value set by the voltage regulator 6 or the output voltage value detected at the output port of the voltage regulator 6, and the load current value represented by the load current signal S03, to thereby determine the power consumption of the load 8.

The detection of the power consumption of the load 8 (output value of the fuel cell 2) is not limited to the above-mentioned computation in the controller 5.

Generally, there may be used for the detection an output detector which can detect the power consumption in the load 8. Thus, a wattmeter for directly detecting the power consumption (output power) is also included. In order to detect the output power of the fuel cell 2, moreover, the current detector 9 may be disposed on the path of current supplied to the voltage regulator 6 via the switch 3.

The load 8 connected to the power supply apparatus 1 is an electric or electronic instrument. In the present embodiment, an electronic load device whose load 8 can be varied arbitrarily is connected to the power supply apparatus 1.

FIGS. 2 to 5 are flow charts showing the control procedure in the controller 5 of the power supply apparatus 1 shown in FIG. 1. (Related processings spanning the different drawings are correspondingly assigned the same symbols "X·A" to "X·F".) In the present embodiment, control is exercised such that any of the power generation cells 2a to 2d showing an abnormality in the output voltage is isolated, and is reconnected if its power generation capacity recovers, and that depending on the output status of the power generation cells 2a to 2d, the connection states of the switching elements 31a to 31k are changed, as appropriate, to change the number of the power generation cells 2a to 2d caused to supply power, and the supply of power in the power generation cells 2a to 2d is brought to a halt, as appropriate, depending on the elapsed time after initiation of power generation. Specifically, the control procedure is as follows:

1) When no fuel is supplied to the power generation cells 2a to 2d, the switching elements 31a to 31k of the switch 3 are all in the OFF state where no electricity flows (see Step S1).

2) When a fuel is supplied to the fuel cell 2, and the voltage detector 4 detects that an electromotive force has been obtained from the power generation cells 2a to 2d, the voltage signals S02a to S02d are entered into the controller 5 (see Step S2). The controller 5 feeds the control signal S01, which brings the switching elements 31i, 31j, 31k and the switching elements 31a, 31h of the switch 3 into the ON state, to the switch 3 in order to connect all of the power generation cells 2a to 2d in series (see Step S3).

3) It is determined, based on the voltage signals S02a to S02d of the power generation cells 2a to 2d, whether the output voltage is a set voltage $V_{th}$ or lower (see Step S4). Preferably, the set voltage $V_{th}$ is set in a range of voltage values which can avoid the deterioration of the output characteristics of any of the power generation cells 2a to 2d associated with a drop in the output voltage of any of the power generation cells 2a to 2d, for example, the range of 0.2 V to 0.4 V. In the present embodiment, $V_{th}$=0.3 V.

4) If the processing in Step S4 shows the output voltage of any of the power generation cells 2a to 2d to be the set voltage $V_{th}$ or lower, the switch 3 is controlled by the control signal S01 to isolate any of the power generation cells 2a to 2d having the output voltage, which is the set voltage $V_{th}$ or lower, from the series connection path. Also, the timer for measuring the isolation time is set, and the program is returned to the processing in Step S4 again (see Step S5).

5) If the processing in Step S4 shows the output voltages of all the power generation cells 2a to 2d exceeding the set voltage $V_{th}$, it is determined whether the down time (isolation time) of any of the power generation cells 2a to 2d isolated from the series connection path in the processing in Step S5 is a set time T1 or longer (see Step S6).

6) Any of the power generation cells 2a to 2d whose down time is T1 or longer as a result of the determination in Step S6 is connected again to the series connection path by controlling the switch 3 by the control signal S01. Also, the timer T1 is reset, and the program is returned again to the processing in Step S4 (see Step S7).

7) If the result of determination in Step S6 shows the down time of less than T1 (including the down time of zero), it is determined whether the power consumption of the load 8 computed by the controller 5 is P3 or less (see Step S8).

8) If the result of the computation is not P3 or less upon processing in Step S8, the program is returned to the processing in Step S4, and the same processings are repeated afterwards.

9) If the processing in Step S8 shows the power consumption of the load 8 to be P3 or less, any one of the power generation cells 2a to 2d may be at rest. Thus, the one of the power generation cells 2a to 2d that has the lowest output voltage of the power generation cells 2a to 2d based on the voltage signals S02a to S02d is isolated from the series connection path (see Step S9).

10) The same processings as those in Steps S4 to S7 are performed (see Steps S10 to S13).

11) If the result of determination in Step S12 shows the down time of less than T1 (including the down time of zero), it is determined whether the power consumption of the load 8 computed by the controller 5 is P3 or more (see Step S14).

12) If it is determined, upon processing in Step S14, that the power consumption of the load 8 is less than P3, it is further determined whether the power consumption of the load 8 computed by the controller 5 is P2 or less (see Step S15).

13) If the result of computation is not P2 or less upon processing in Step S15, it is determined whether the continuous power generation time of each of the power generation cells 2a to 2d is a set time T2 or longer. If it is not the set time T2 or longer, the program is returned to the processing in Step S14 (see Step S16). Here, the set time T2 has been set based on changes over time in the output characteristics due to continuous power generation of the power generation cells 2a to 2d. In the present embodiment, the set time T2 has been set at 20 minutes. This set time T2 is preset in the timer of the controller 5.

14) The one of the power generation cells 2a to 2d having the lowest output voltage of the power generation cells 2a to 2d, which have been found to have a set time of T2 or more upon processing in Step S16, is isolated from the series connection path. At the same time, any of the power generation cells 2a to 2d whose power generation has been brought to a halt is connected in series with the series connection path, and the time measuring action of the timer is reset, whereupon the program is returned to the processing in Step S10 (see Step S17).

15) If the processing in Step S15 shows the power consumption of the load 8 to be P2 or less, another one of the power generation cells 2a to 2d may be at rest. Thus, the one of the power generation cells 2a to 2d that has the lowest output voltage of the power generation cells 2a to 2d based on the voltage signals S02a to S02d is isolated from the series connection path (see Step S18).

16) The same processings as those in Steps S4 to S7 are performed (see Steps S19 to S22).

17) It is determined whether the power consumption of the load 8 computed by the controller 5 is P2 or more and, if the result of the computation is P2 or more, the program is returned to the processing in Step S3 (see Step S23).

18) If it is determined, upon processing in Step S23, that the power consumption of the load 8 is less than P2, it is further determined whether the power consumption of the load 8 computed by the controller 5 is P1 or less (see Step S24).

19) If the result of computation is not P1 or less upon processing in Step S24, it is determined whether the continuous power generation time of each of the power generation cells 2a to 2d is the set time T2 or longer. If it is not the set time T2 or longer, the program is returned to the processing in Step S23 (see Step S25).

20) If the processing in Step S25 determines that the continuous power generation time is the set time T2 or longer, all the power generation cells 2a to 2d are connected in series, and two of the power generation cells 2a to 2d which have low output voltages are isolated from the series connection path. Also, the time measuring action of the timer is reset, whereupon the program is returned to the processing in Step S19 (see Step S26).

21) If the processing in Step S24 shows the power consumption of the load 8 to be P1 or less, still another one of the power generation cells 2a to 2d may be at rest (total three of them at rest). Thus, the one of the power generation cells 2a to 2d that has the lowest output voltage of the power generation cells 2a to 2d based on the voltage signals S02a to S02d is isolated from the series connection path (see Step S27).

22) The same processings as those in Steps S4 to S7 are performed (see Steps S28 to S31).

23) It is determined whether the power consumption of the load 8 computed by the controller 5 is P1 or more and, if the result of the computation is P1 or more, the program is returned to the processing in Step S3 (see Step S32).

24) If it is determined, upon processing in Step S32, that the power consumption of the load 8 is less than P1, it is determined whether the continuous power generation time of each of the power generation cells 2a to 2d is the set time T2 or longer (see Step S33).

25) If the processing in Step S33 determines that the continuous power generation time is the set time T2 or longer, the controller 5 connects all the power generation cells 2a to 2d in series, and isolates three of the power generation cells 2a to 2d having low output voltages from the series connection path. Also, the controller 5 resets the time measuring action of the timer, and returns the program to the processing in Step S28 (see Step S34).

26) If the processing in Step S33 determines that the continuous power generation time is less than the set time T2, it is determined whether the power consumption of the load 8 is zero (see Step S35). If it is not zero, the program is returned to the processing in Step S28, and the processings in the subsequent steps are repeated until the power consumption of the load 8 becomes zero. At a time when zero is reached, the switch 3 is brought to the OFF state to terminate the action of the power supply apparatus 1 (see Step S36).

Second Embodiment

Figure 6:
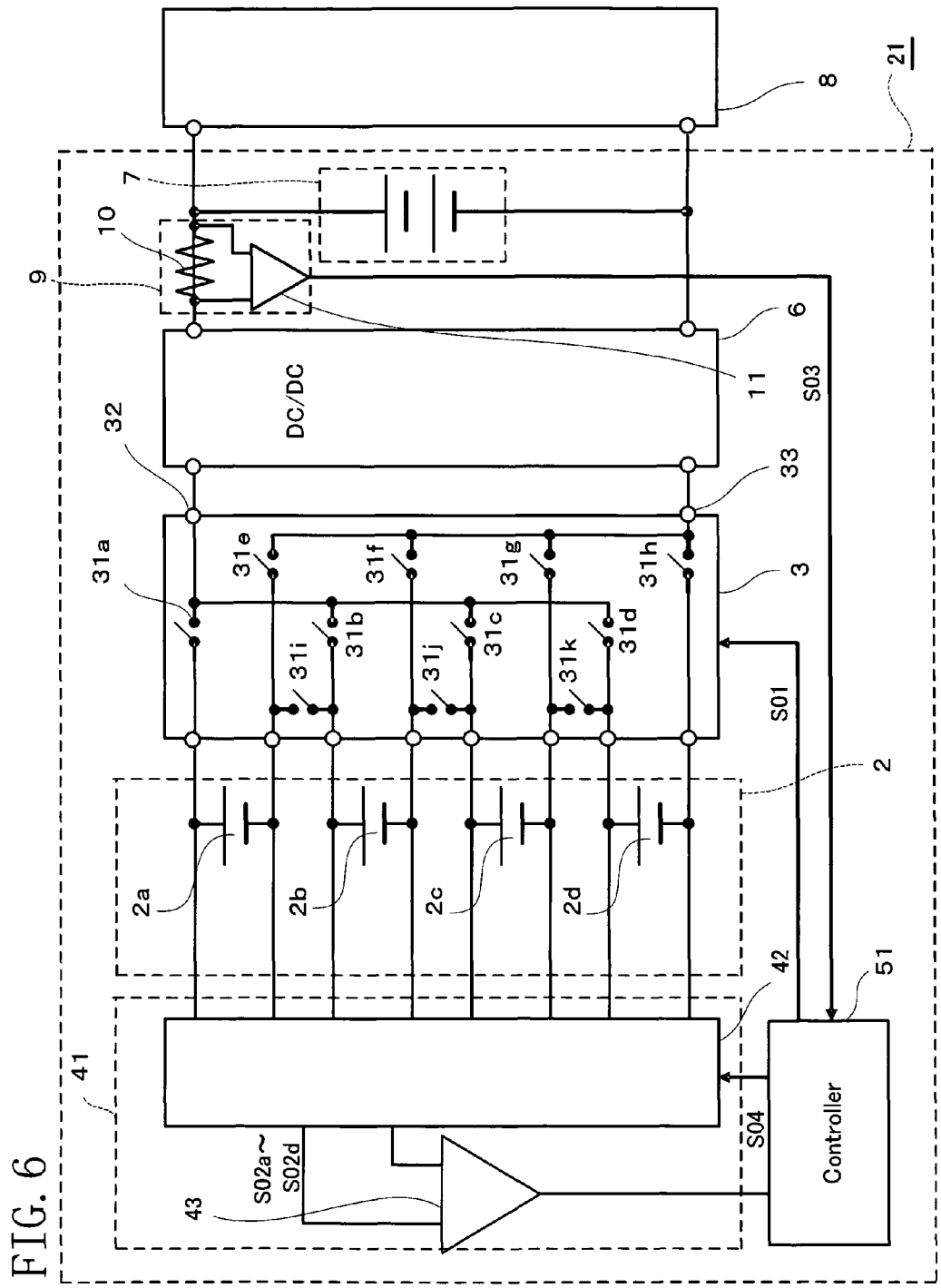
FIG. 6 is a block diagram showing a power supply apparatus according to a second embodiment of the present invention.
Figure 7:
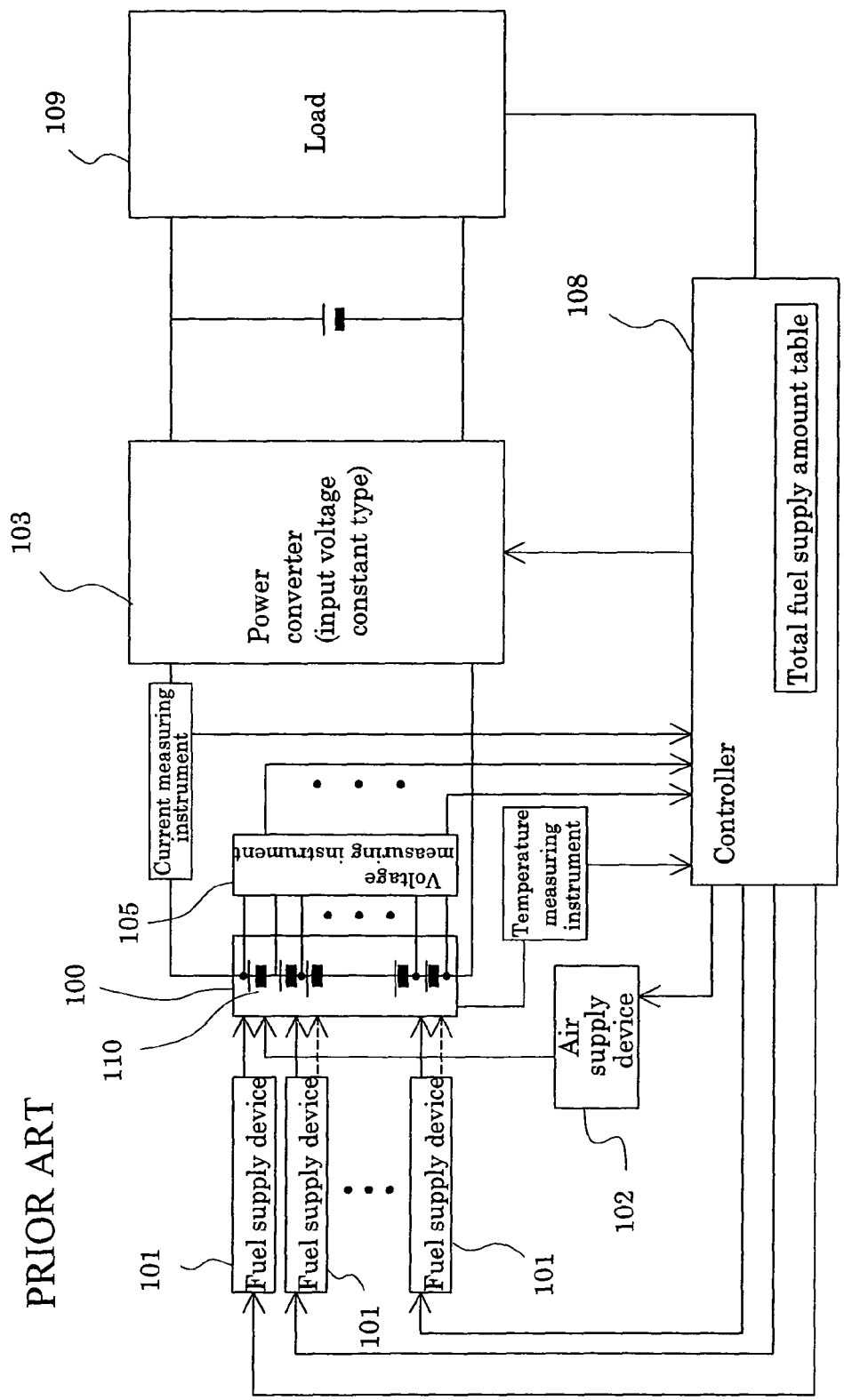
FIG. 7 is a block diagram showing a fuel cell apparatus according to the conventional technology.

FIG. 6 is a block diagram showing a power supply apparatus according to a second embodiment of the present invention. As shown in the drawing, a power supply apparatus 21 according to the present embodiment has the configuration of the voltage detector 4 modified to serve as a voltage detector 41. That is, the voltage detector 41 in the present embodiment has an analog multiplexer 42 connected to the output ports of a plurality of power generation cells 2a to 2d, and switches over time (scans) the power generation cells 2a to 2d whose voltages are to be detected. A voltage detecting amplifier 43 is connected to the output port of the analog multiplexer 42. Voltage signals S02a to S02d of the power generation cells 2a to 2d are sequentially supplied to a controller 51 via the voltage detecting amplifier 43. Control of scanning on this occasion is exercised by the controller 51 via a control signal S04. By the action of the controller 51, scanning of the power generation cells 2a to 2d having voltages detected is performed with cycles of 200 ms, and a delay time for voltage detection is set at 50 ms. The controller 51 has a program for controlling the above-described scanning action of the voltage detector 41, in addition to the program of the controller 5 in the First Embodiment.

Other features are the same as those of the power supply apparatus 1 according to the First Embodiment shown in FIG. 1. Thus, the same portions are assigned the same numerals as in the power supply apparatus 1, and duplicate explanations are omitted.

In the present embodiment as well, the controller 51 effects the control of the switch 3 and the output control of the power generation cells 2a to 2d in accordance with the procedure shown in FIGS. 2 to 5.

Other Embodiments

In the First Embodiment and the Second Embodiment described above, the controllers 5, 51 are adapted to exercise 1) the first control for preventing reversal, and resuming the supply of power from any of the power generation cells 2a to 2d which has recovered the power generation capacity, and 2) the second control for changing the connection status of the power generation cells 2a to 2d in conformity with the load power, and selecting, as appropriate, the power generation cells 2a to 2d whose power supply is to be halted, thereby contributing to a reasonable operation. However, the controllers 5, 51 need not be adapted to effect such controls, but may be adapted to effect only the first control.

Even in this case, control can be exercised such that when the generated voltage between the electrodes of each of the power generation cells 2a to 2d has dropped to a set voltage or lower, the power cell concerned of the power generation cells 2a to 2d is isolated to halt the supply of power therefrom, and when recovery of the power generation capacity of the isolated power cell of the power generation cells 2a to 2d has been detected, the supply of power from it is resumed. Thus, reversal of any of the power generation cells 2a to 2d can be prevented and, when its power generation capacity has been recovered, its power generation is resumed. Consequently, the effects are obtained that the reasonable operation of the power supply apparatus 1 can be achieved, with the reversal of the power generation cells 2a to 2d being prevented.

The invention claimed is:

1. A power supply apparatus, comprising:
    a combined power source comprised of a plurality of power cells configured electrically independently;
    a switch connected to the combined power source and configured to arbitrarily change connection paths of the respective power cells by selectively connecting terminals of the plurality of power cells through switching elements;
    a voltage detector configured to detect differences in electrical potentials between the terminals of the plurality of power cells; and
    control means for controlling ON-OFF states of the switching elements by controlling the switch by a control signal generated based on voltage signals representing the differences in electrical potentials detected by the voltage detector so as to isolate a power cell from among the plurality of power cells to stop a supply of electric power from the isolated power cell when a voltage generated in the isolated power cell has dropped to a specified voltage or lower, and for restarting the supply of electric power from the isolated power cell whose power supply has been stopped when the duration of a down time of the power cell has reached a predetermined time or longer.

2. A power supply apparatus according to claim 1; wherein the switch has first switching elements, whose number is equal to a number of the power cells, between the positive electrode of output ports of the switch and positive electrodes of the respective power cells; second switching elements, whose number is equal to the number of the power cells, between the negative electrode of the output ports of the switch and negative electrodes of the respective power cells; and third switching elements, whose number is smaller than the number of the power cells by one, between the power cells adjacent in a series direction of the power cells.

3. A power supply apparatus according to claim 1; further comprising:
    a voltage regulator connected between the switch and a load and configured to stabilize a voltage supplied to the load; and
    an output detector configured to detect a power consumption in the load and/or an output power of the combined power source;
    wherein the control means controls the ON-OFF states of the switching elements by controlling the switch by the control signal generated based on the voltage signals representing the differences in electrical potentials detected by the voltage detector, the power consumption, and the output power of the combined power source.

4. A power supply apparatus according to claim 3; wherein the control means controls a connection status of each of the power cells via the switch so as to stop the supply of electric power from a power cell having a lowest output voltage, if it has been detected that a power value detected by the output detector is equal to or lower than an output power preset based on a power generating capacity of the combined power source.

5. A power supply apparatus according to claim 3; wherein the control means controls a connection status of each of the power cells via the switch so as to stop the supply of electric power from a power cell having a lowest output voltage, when a continuous power generation time of each power cell becomes a predetermined time or longer, if it has been detected that a power value detected by the output detector is equal to or lower than an output power preset based on a power generating capacity of the combined power source.

6. A power supply apparatus according to claim 3; wherein the control means controls a connection status of each of the power cells via the switch so as to stop the supply of electric power from the plurality of power cells in order of increasing output voltage, when a continuous power generation time of each power cell becomes a predetermined time or longer, if it has been detected that a power value detected by the output detector is equal to or lower than an output power preset based on a power generating capacity of the combined power source.

7. A power supply apparatus according to claim 3; wherein the control means controls a connection status of each of the power cells via the switch so as to stop the supply of electric power from a power cell having a lowest output voltage and to restart the supply of electric power from the power cell whose power supply has been stopped until then, and which is different from the power cell having the lowest output voltage, when a continuous power generation time of each power cell becomes a predetermined time or longer, if it has been detected that a power value detected by the output detector is equal to or lower than an output power preset based on a power generating capacity of the combined power source.

8. A power supply apparatus according to claim 3; wherein the output detector is configured to detect the power consumption based on an output voltage of the voltage regulator and a load current supplied to the load.

9. A power supply apparatus according to claim 1; wherein the voltage detector is further configured to connect output ports of the respective power cells to a multiplexer, to sequentially switch and scan the power cells, whose voltages are to be detected, by a control signal of the control means, and to connect a voltage detecting instrument to an output port of the multiplexer to sequentially supply the voltage signals of the respective power cells to the control means.

10. A power supply apparatus, comprising:
a combined power source having a plurality of power cells configured electrically independently;
a switch configured to arbitrarily connect each of the power cells by selectively connecting between terminals of the power cells through first switching elements between the positive electrode of output ports of the switch and positive electrodes of the respective power cells, second switching elements between the negative electrode of the output ports of the switch and negative electrodes of the respective power cells, and third switching elements between the power cells adjacent in a series direction of the power cells;
a voltage detector configured to respectively detect differences in electric potentials between the terminals of the power cells;
an output detector configured to detect a power consumption in a load and/or an output power of the combined power source; and
control means for controlling ON-OFF states of the switching elements so as to isolate from the plurality of power cells a power cell to stop a supply of electric power from the isolated power cell when a voltage generated in the isolated power cell has dropped to a specified voltage level or below as determined based on voltage signals respectively indicating the differences in electric potentials detected by the voltage detector, and for restarting the supply of electric power from the isolated power cell whose power supply has been stopped when the duration of the downtime of the isolated power cell has reached a predetermined time or greater.

11. A power supply apparatus according to claim 10; wherein a number of each of the first switching elements and the second switching elements is equal to the number of the power cells; and wherein a number of the third switching elements is smaller than the number of the power cells by one.

12. A power supply apparatus according to claim 10; wherein the control means controls the ON-OFF states of the switching elements by controlling the switch by the control signal generated based on the voltage signals representing the differences in electrical potentials detected by the voltage detector, the power consumption, and the output power of the combined power source.

13. A power supply apparatus according to claim 10; further comprising a voltage regulator connected between the switch and the load and configured to stabilize a voltage supplied to the load; and wherein the output detector is configured to detect the power consumption based on an output voltage of the voltage regulator and a load current supplied to the load.

14. A power supply apparatus according to claim 10; wherein the control means controls a connection status of each of the power cells via the switch so as to stop the supply of electric power from a power cell having a lowest output voltage, if it has been detected that a power value detected by the output detector is equal to or lower than an output power preset based on a power generating capacity of the combined power source.

15. A power supply apparatus, according to claim 10; wherein the control means controls a connection status of each of the power cells via the switch so as to stop the supply of electric power from a power cell having a lowest output voltage, when a continuous power generation time of each power cell becomes a predetermined time or longer, if it has been detected that a power value detected by the output detector is equal to or lower than an output power preset based on a power generating capacity of the combined power source.

16. A power supply apparatus according to claim 10; wherein the control means controls a connection status of each of the power cells via the switch so as to stop the supply of electric power from the plurality of power cells in order of increasing output voltage, when a continuous power generation time of each power cell becomes a predetermined time or longer, if it has been detected that a power value detected by the output detector is equal to or lower than an output power preset based on a power generating capacity of the combined power source.

17. A power supply apparatus according to claim 10; wherein the control means controls a connection status of each of the power cells via the switch so as to stop the supply of electric power from a power cell having a lowest output voltage and to restart the supply of electric power from the power cell whose power supply has been stopped, when a continuous power generation time of each power cell becomes a predetermined time or longer, if it has been detected that a power value detected by the output detector is equal to or lower than an output power preset based on a power generating capacity of the combined power source.

* * * * *